US012606446B2

(12) United States Patent
Lee et al.

(10) Patent No.: US 12,606,446 B2
(45) Date of Patent: Apr. 21, 2026

(54) AEROGEL COMPOSITE

(71) Applicant: LG Chem, Ltd., Seoul (KR)

(72) Inventors: Kyung Hyun Lee, Daejeon (KR); Kyoungshil Oh, Daejeon (KR); Mi Ri Kim, Daejeon (KR); Saebomi Park, Daejeon (KR); Yongjin Bae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/947,900

(22) Filed: Nov. 14, 2024

(65) Prior Publication Data

US 2025/0353751 A1 Nov. 20, 2025

(30) Foreign Application Priority Data

May 16, 2024 (KR) ........................ 10-2024-0064050

(51) Int. Cl.
*C01B 33/158* (2006.01)
*B01J 13/00* (2006.01)

(52) U.S. Cl.
CPC ....... *C01B 33/1585* (2013.01); *B01J 13/0091* (2013.01); *C01P 2006/10* (2013.01); *C01P 2006/16* (2013.01)

(58) Field of Classification Search
CPC .............. C01B 33/1585; B01J 13/0091; C01P 2006/10; C01P 2006/16
See application file for complete search history.

(56) References Cited

U.S. PATENT DOCUMENTS

| | | | |
|---|---|---|---|
| 2,734,827 | A | 2/1956 | Hooks |
| 7,560,062 | B2 | 7/2009 | Gould et al. |
| 10,759,666 | B2 | 9/2020 | Hindelang et al. |
| 11,274,044 | B2 | 3/2022 | Kim et al. |
| 11,577,490 | B2 | 2/2023 | Oikawa et al. |
| 2002/0094426 | A1 | 7/2002 | Stepanian et al. |
| 2006/0125158 | A1 | 6/2006 | Rouanet et al. |
| 2010/0143717 | A1 | 6/2010 | Sakamoto et al. |
| 2016/0032584 | A1 | 2/2016 | Doshi et al. |
| 2016/0369059 | A1 | 12/2016 | Kotake et al. |
| 2017/0210092 | A1 | 7/2017 | Rikleen et al. |
| 2017/0283269 | A1 | 10/2017 | Kotake et al. |
| 2018/0009969 | A1 | 1/2018 | Kim et al. |
| 2018/0010726 | A1 | 1/2018 | Kim et al. |
| 2018/0029892 | A1 | 2/2018 | Yu et al. |
| 2018/0086587 | A1 | 3/2018 | Kim et al. |
| 2018/0134566 | A1 | 5/2018 | Kim et al. |
| 2018/0141821 | A1 | 5/2018 | Hindelang et al. |
| 2018/0244029 | A1 | 8/2018 | Kim et al. |
| 2018/0313001 | A1 | 11/2018 | Dempsey |
| 2018/0326700 | A1 | 11/2018 | Kim |
| 2019/0062167 | A1 | 2/2019 | Kim et al. |
| 2019/0374921 | A1 | 12/2019 | Mihalcik et al. |
| 2020/0048100 | A1 | 2/2020 | Yu et al. |
| 2020/0108583 | A1 | 4/2020 | Oikawa et al. |

| | | | |
|---|---|---|---|
| 2020/0215791 | A1 | 7/2020 | Oh et al. |
| 2020/0378058 | A1 | 12/2020 | Oikawa et al. |
| 2021/0016239 | A1 | 1/2021 | Kim et al. |
| 2021/0155486 | A1* | 5/2021 | Kang .................... C01B 33/152 |
| 2021/0163303 | A1 | 6/2021 | Evans et al. |
| 2021/0309527 | A1 | 10/2021 | Evans et al. |
| 2021/0363699 | A1 | 11/2021 | Afshari et al. |
| 2021/0370636 | A1 | 12/2021 | Tsuruta et al. |
| 2022/0098046 | A1 | 3/2022 | Lee et al. |
| 2022/0195137 | A1 | 6/2022 | Movahhed et al. |
| 2022/0204350 | A1* | 6/2022 | Oh ........................ C01B 33/155 |
| 2022/0380222 | A1 | 12/2022 | Kim et al. |
| 2023/0024770 | A1 | 1/2023 | Kim et al. |
| 2023/0050685 | A1 | 2/2023 | Kim et al. |
| 2023/0212079 | A1 | 7/2023 | Somberg et al. |
| 2023/0331560 | A1 | 10/2023 | Kim et al. |
| 2023/0348285 | A1 | 11/2023 | Numrich et al. |
| 2024/0042731 | A1 | 2/2024 | Servati et al. |

FOREIGN PATENT DOCUMENTS

| | | |
|---|---|---|
| CN | 101680128 B | 1/2013 |
| CN | 107140938 A | 9/2017 |
| CN | 106565268 B | 1/2020 |
| CN | 113939942 A | 1/2022 |
| CN | 115748088 A | 3/2023 |
| CN | 116154360 A | 5/2023 |
| CN | 116945715 A | 10/2023 |
| EP | 4056539 A1 | 9/2022 |
| JP | WO2017-221687 A1 | 1/2019 |
| JP | WO2018-163354 A1 | 12/2019 |
| JP | 2020-060291 A | 4/2020 |
| JP | 2021-036038 A | 3/2021 |
| JP | 2022-529347 A | 6/2022 |
| JP | 7285085 B2 | 6/2023 |

(Continued)

OTHER PUBLICATIONS

A Klochkov et al., "Pulse NMR of 3He in aerogel at temperature 1.5 K", Journal of Physics, Conference Series, 150, 032043, 2009.

A. Emmerling et al., "Small angle scattering and the structure of aerogels", Journal of Non-Crystalline Solids, vol. 145, pp. 113-120, 1992.

Jeong, Sangbae, et al., "Application of Silica Aerogel as an Interlayer Insulating Film", The Korean Ceramic Society, Ceramist, vol. 4, issue 6, pp. 84-90, 2001.

Jun-Jie Zhao et al., "A 3-D numerical heat transfer model for silica aerogels based on the porous secondary nanoparticle aggregate structure", Journal of Non-Crystalline Solids, vol. 358, pp. 1287-1297, May 2012.

Yan-Jun Dai et al., "A Theoretical Model for the Effective Thermal Conductivity of Silica Aerogel Composites" Applied Thermal Engineering, vol. 128, pp. 1634-1645, Jan. 2018.

International Search Report for Application No. PCT/KR2024/013053 mailed Dec. 19, 2024, 3 pages. [See p. 1, categorizing the cited references].

(Continued)

*Primary Examiner* — Sally A Merkling
*Assistant Examiner* — Logan Laclair
(74) *Attorney, Agent, or Firm* — Lerner David LLP

(57) ABSTRACT

An aerogel composite which maintains a high degree of hydrophobicity, and also an excellent level of heat insulation properties even when exposed to a high-temperature environment.

20 Claims, No Drawings

(56) References Cited

FOREIGN PATENT DOCUMENTS

| | | | |
|---|---|---|---|
| JP | 7352769 | B2 | 9/2023 |
| JP | 7368327 | B2 | 10/2023 |
| KR | 20050022986 | A | 3/2005 |
| KR | 20070100738 | A | 10/2007 |
| KR | 100909732 | B1 | 7/2009 |
| KR | 20090078357 | A | 7/2009 |
| KR | 100955622 | B1 | 5/2010 |
| KR | 20120116944 | A | 10/2012 |
| KR | 101281689 | B1 | 7/2013 |
| KR | 2013-0138275 | A | 12/2013 |
| KR | 20150090320 | A | 8/2015 |
| KR | 20160100082 | A | 8/2016 |
| KR | 101654795 | B1 | 9/2016 |
| KR | 2016-0125956 | A | 11/2016 |
| KR | 20170060027 | A | 5/2017 |
| KR | 101748532 | B1 | 6/2017 |
| KR | 101752091 | B1 | 6/2017 |
| KR | 2017-0098141 | A | 8/2017 |
| KR | 20170104914 | A | 9/2017 |
| KR | 2017-0132829 | A | 12/2017 |
| KR | 2018-0033064 | A | 4/2018 |
| KR | 101911188 | B1 | 10/2018 |
| KR | 101928538 | B1 | 12/2018 |
| KR | 101966406 | B1 | 4/2019 |
| KR | 101993643 | B1 | 6/2019 |
| KR | 102023531 | B1 | 9/2019 |
| KR | 2020-0073730 | A | 6/2020 |
| KR | 2020-0095323 | A | 8/2020 |
| KR | 102192354 | B1 | 12/2020 |
| KR | 20210038374 | A | 4/2021 |
| KR | 20210038375 | A | 4/2021 |
| KR | 2021-0071508 | A | 6/2021 |
| KR | 2021-0146798 | A | 12/2021 |
| KR | 20210157353 | A | 12/2021 |
| KR | 2022-0049841 | A | 4/2022 |
| KR | 20220109454 | A | 8/2022 |
| KR | 20220137360 | A | 10/2022 |
| KR | 2022-0154727 | A | 11/2022 |
| KR | 2022-0164499 | A | 12/2022 |
| KR | 2023-0005300 | A | 1/2023 |
| WO | 2008051029 | A1 | 5/2008 |
| WO | 2017155311 | A1 | 9/2017 |
| WO | 2022126279 | A1 | 6/2022 |

OTHER PUBLICATIONS

International Search Report for Application No. PCT/KR2024/015088 mailed Jan. 16, 2025. 3 pages (see p. 2-3, categorizing the cited references).

D'agostino, C. et al., "Effect of paramagnetic species on T1, T2 and T1/T2 NMR relaxation times of liquids in porous CuSO4/Al2O3" Royal Society Of Chemistry, RSC Advances, Jul. 2017, pp. 36163-36167, vol. 7.

International Search Report for Application No. PCT/KR2025/003925 dated Jun. 30, 2025. 5 pages.

International Search Report for Application No. PCT/KR2025/003927 dated Jun. 30, 2025. 5 pages.

Ok, S. et al., "Fluid Behavior in Nanoporous Silica" Frontiers in Chemistry, Aug. 2020, pp. 1-20, vol. 8. Article 734.

International Search Report for Application No. PCT/KR2025/006641 mailed Aug. 29, 2025. 6 pages.

* cited by examiner

AEROGEL COMPOSITE

CROSS-REFERENCE TO RELATED APPLICATION

This application claims priority to Korean Patent Application No. 10-2024-0064050 filed on May 16, 2024, the content of which is incorporated by reference in its entirety.

TECHNICAL FIELD

The present disclosure relates to an aerogel, an aerogel composite and the application use thereof as a heat insulation material.

BACKGROUND

Aerogel is a super-porous, high specific surface area ($\geq 500$ m²/g) material having a porosity of approximately 90.0% to 99.9% and a pore size in the range of 1 nm to 100 nm, and is a material having excellent properties of ultra-light weight/super-heat insulation/ultra-low dielectric, and the like. Accordingly, research on the development of aerogel materials as well as research on the application use thereof as transparent heat insulation materials and environmentally friendly high-temperature heat insulation materials, ultra-low dielectric thin films for highly integrated devices, catalysts and catalyst carriers, electrodes for supercapacitors, and electrode materials for seawater desalination have been actively conducted.

The biggest advantages of the aerogel are that the aerogel has super-insulation properties exhibiting a thermal conductivity of 0.300 W/m. K or less, which is lower than that of a conventional organic heat insulation material such as Styrofoam, thereby solving the problems associated with the conventional organic heat insulation material, such as fire vulnerability and generation of harmful gases in case of a fire.

An aerogel blanket in which aerogel is formed in a fiber is a functional heat insulation material, and is widely used in construction or industrial fields, and in addition, the hydrophobic silica aerogel blanket may be usefully used as a heat insulation material, thermal insulation material, or non-combustible material for aircraft, ships, automobiles, batteries, and the like.

Meanwhile, such an aerogel blanket is manufactured by preparing a silica sol from a silica precursor such as water glass and an alkoxysilane group (TEOS, TMOS, MTMS, etc.), and then mixing a fiber with the sol to be gelled, followed by performing aging, surface modification, and drying thereon.

If the entire aerogel blanket is not sufficiently hydrophobized during the above-described process, a hydrophobic group on the surface of aerogel or inside pores, for example, a methyl group or an ethyl group, is burned during normal pressure drying and loses hydrophobicity, which not only leads to degradation in heat insulation performance due to moisture penetration, but also leads to permanent loss of heat insulation performance due to the collapse of a pore structure caused by contraction during an evaporation process of the penetrated moisture.

Therefore, in order to use an aerogel blanket in a heat insulation material and the like, it is important to allow a hydrophobic group to be stably present not only on the surface of the aerogel blanket but also in pores present thereinside to maintain high hydrophobicity, thereby preventing deterioration in heat insulation performance.

SUMMARY

The present disclosure provides an aerogel composite or a heat insulation member including the same, wherein a hydrophobic group inside a pore of the aerogel composite is stably present even when the aerogel composite is exposed to a high-temperature environment such as normal pressure drying, so that high hydrophobicity may be maintained.

However, the technical task to be achieved by the present disclosure is not limited to the aforementioned task, and other tasks that are not mentioned will be clearly understood by those skilled in the art from the following description.

In accordance with an aspect of the present disclosure, an aerogel composite includes a fiber substrate, and aerogel including a plurality of open pores, wherein the aerogel includes a plurality of silica aerogel particles, wherein according to the result of performing NMR analysis on the aerogel particles by using water ($H_2O$) as a saturation fluid, a ratio $T_1/T_2$ of $T_1$ relaxation time to $T_2$ relaxation time may be $0.4 \times 10^3$ to $1.0 \times 10^3$, or $0.4 \times 10^3$ to $0.9 \times 10^3$.

According to the result of heat-treating the aerogel particles separated from the aerogel composite at a temperature of 200° C. for 1 hour, and then performing NMR analysis on the aerogel particles by using water ($H_2O$) as a saturation fluid, the ratio $T_1/T_2$ of $T_1$ relaxation time to $T_2$ relaxation time may be $0.4 \times 10^3$ to $1.0 \times 10^3$.

In addition, the ratio of $T_1/T_2$ with respect to the aerogel particles after performing heat treatment on the aerogel particles separated from the aerogel composite at a temperature of 200° C. for 1 hour may be 0.8 times to 1.2 times, or 0.85 times to 1.1 times the ratio of $T_1/T_2$ with respect to the aerogel particles before the heat treatment.

The aerogel may include pores having a pore diameter of 5 nm to 20 nm at 25% or less, or 10% to 25% of the pore volume of a skeletal structure.

The aerogel composite may have a moisture impregnation rate (wt %) of 4 wt % or less, which is represented by the following Equation 1. However, in the following equation, the weight of a sample after impregnation means the weight measured after impregnating an aerogel composite sample in distilled water at 21±2° C. for 15 minutes, wherein the sample has a size of 100 mm×100 mm in width×length.

$$
\begin{aligned}
\text{Moisture impregnation rate (wt \%)} = \quad &\text{[Equation 1]}\\
\{(\text{Weight of a sample after impregnation} - \\
\text{Weight of the sample before impregnation})/ \\
(\text{Weight of the sample before impregnation})\} \times 100
\end{aligned}
$$

However, in Equation 1 above, if the width×height of the sample used in the experiment is 10 mm×10 mm, the moisture impregnation rate (wt %) of the aerogel composite may be 3 wt % or less.

In addition, the moisture impregnation rate (wt %) after performing heat treatment on the aerogel composite at a temperature of 200° C. for 1 hour may be 10 wt % or less, which is represented by Equation 1 above.

The aerogel composite may have a water vapor absorption rate of 2.5 wt % or less, which is according to the ASTM C1104 test method.

The aerogel may comprise at least one selected from the group consisting of silica, methylsilylated silica, dimethylsilylated silica, and trimethylsilylated silica.

The plurality of silica aerogel particles may comprise a particle in which a plurality of aerogel particles having a particle diameter of greater than 0 nm to 5 nm are aggregated or bonded. At this time, the aggregated or bonded aerogel particles may have an average particle diameter of 5 nm to 2,000 nm.

The aerogel composite may have a thickness of 0.5 mm to 20 mm.

The aerogel composite may have a density of 0.05 $g/cm^3$ to 0.50 $g/cm^3$.

The aerogel composite may have a compressive strength of 20 kPa to 80 kPa at 10% strain, and may have a tensile strength of 30 $N/cm^2$ to 60 $N/cm^2$.

In accordance with another aspect of the present disclosure, an aerogel comprises a plurality of open pores, and a plurality of silica aerogel particles, wherein according to the result of performing NMR analysis on the aerogel particles by using water ($H_2O$) as a saturation fluid, a ratio $T_1/T_2$ of $T_1$ relaxation time to $T_2$ relaxation time may be $0.4 \times 10^3$ to $1.0 \times 10^3$, or $0.4 \times 10^3$ to $0.9 \times 10^3$. According to the result of heat-treating the aerogel particles at a temperature of 200° C. for 1 hour, the ratio $T_1/T_2$ of $T_1$ relaxation time to $T_2$ relaxation time may be $0.4 \times 10^3$ to $1.0 \times 10^3$.

In addition, the ratio of $T_1/T_2$ with respect to the aerogel particles after heat treatment at a temperature of 200° C. for 1 hour may be 0.8 times to 1.2 times, or 0.85 times to 1.1 times the ratio of $T_1/T_2$ with respect to the aerogel particles before the heat treatment.

In accordance with an aspect of the present disclosure, a heat insulation member includes the above-described aerogel composite.

The heat insulation member may further include a support member positioned on at least one surface of an upper surface of the aerogel composite or a lower surface thereof.

DETAILED DESCRIPTION

Hereinafter, the present disclosure will be described in more detail to facilitate understanding of aspects of the present disclosure. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the invention.

According to one aspect of the present disclosure, an aerogel composite includes a fiber substrate, and aerogel including a plurality of open pores.

In the present disclosure, the "aerogel" includes a plurality of primary aerogel particles having a size of greater than approximately 0 nm to less than or equal to 10 nm, or greater than 0 nm to less than or equal to 5 nm, and a secondary aerogel particle formed by aggregation or combination of the above-described primary aerogel particles, and since a plurality of open pores are formed between the above-described primary aerogel particles and between the secondary aerogel particles to form an aggregate, the aerogel forms a three-dimensional network structure.

In the present disclosure, the aerogel may be inorganic silica aerogel formed from a silicon alkoxide-based compound or water glass as a precursor. As an example, the aerogel may comprise at least one selected from the group consisting of silica, methylsilylated silica, dimethylsilylated silica, and trimethylsilylated silica. As another example, the aerogel may be that at least a portion of $SiO_2$ present on the surface of a $SiO_2$ network structure has a bonding structure of Si—O—$SiO_2(CH_3)$, Si—O—$SiO(CH_3)_2$, or Si—O—Si $(CH_3)_3$. A specific process for preparing silica aerogel will be described in detail below.

In the present disclosure, aerogel particles may be positioned on the fiber substrate, and in voids between neighboring fiber substrates. In the present disclosure, the "aerogel particles" are particles in the form of individual solid units constituting aerogel, and may include both primary aerogel particles having a size of greater than approximately 0 nm to less than or equal to 10 nm, or greater than 0 nm to 5 nm, or having a size of approximately 1 nm or less, and secondary aerogel particles formed by aggregation of the above-described particles. However, aerogel in an aerogel composite is mostly in the form of secondary aerogel particles or in the form in which the secondary aerogel particles are aggregated and combined, and there may be trace mixtures of primary aerogel particles that do not form secondary aerogel particles. The secondary aerogel particles may have an average particle diameter of approximately 5 nm to 2,000 nm, 5 nm to 1,000 nm, 5 nm to 500 nm, 5 nm to 100 nm, or 5 nm to 50 nm, but are not limited thereto. In the present disclosure, the above-described average particle size may be measured by any method known to those skilled in the art, such as scanning electron microscopy, dynamic light scattering, optical microscopy, or size exclusion, but the method is not limited thereto.

In the present disclosure, the aerogel may have a matrix skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. In the present disclosure, the aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. For example, the aerogel of the present disclosure may include mesopores. For example, the aerogel of the present disclosure may include mesopores and micropores. In the present disclosure, the pore size may be measured by any means known to those skilled in the art, such as a gas adsorption experiment, mercury infiltration, capillary flow porometry, positron annihilation lifetime spectroscopy (PALS), or the like, but is not limited thereto.

The aerogel composite of the present disclosure has a structure in which at least some of a plurality of aerogel particles are dispersed, preferably combined, on the surface of a substrate including a fiber, and at the same time, has a structure in which at least some of the plurality of aerogel particles are dispersed, preferably positioned, in an empty space between discrete fibers in the substrate. In the present disclosure, examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof.

In the present disclosure, the fiber substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil (manufactured by Saffil), Durablanket (manufactured by Unifrax) or other silica fibers, Duraback® (manufactured by Carborundum), a polyaramid fiber such as Kevlar®, Nomex®, or Sontera® (all manufactured by DuPont), CONEX (manufactured by Taijin), a polyolefin such as Tyvek® (manufactured by DuPont), Dyneema (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Goretex® (manufactured by W.L. GORE), a silicon carbide fiber such as NICALCON (manufactured by COI Ceramics), a ceramic fiber such as NEXTEL (manufactured by 3M), a ceramic paper, an acrylic polymer, wool, silk, hemp, leather, a suede fiber, a PBO fiber Zylong® (manufactured by Toyobo), a liquid crystal material such as VECTAN (manufactured by Hoechst), a cambrel fiber (manufactured by DuPont), polyurethane, polyamide, a wool fiber, a basalt fiber, boron, aluminum, iron, a stainless steel fiber or other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance. As an example, the fiber substrate may comprise of a glass fiber or a basalt fiber or a ceramic paper.

In the present disclosure, the thickness of the fiber substrate may be 0.5 mm to 20 mm, but is not limited thereto.

In addition, in the present disclosure, the thickness of the aerogel composite may be 0.5 mm to 20 mm, but is not limited thereto.

In general, in preparing an aerogel composite, hydrophobicity is imparted to the aerogel composite through a surface modification process in order to prevent the degradation in heat insulation performance due to moisture penetration when the aerogel composite is applied as a heat insulation material. However, only when the surface of the aerogel composite as well as pores present inside an aerogel matrix are sufficiently hydrophobized, and the elasticity and strength of the pores are excellent, the aerogel composite may maintain high hydrophobicity even when the aerogel composite is exposed to a high-temperature environment, and thus, may also maintain heat insulation at an excellent level.

In this regard, in order to analyze structural features of pores included in an aerogel composite of the present disclosure, particularly an aerogel matrix, and the degree of hydrophobization inside the pores, nuclear magnetic resonance spectroscopy (NMR) analysis was performed.

In the present disclosure, the NMR analysis uses 600 MHZ NMR to detect hydrogen atoms (1H) with a non-zero magnetic moment, and is performed through spectroscopy measurement, relaxation measurement, diffusion measurement, or imaging measurement. NMR signals of a fluid in pores of a sample and a fluid outside the sample may be detected. At this time, in the present disclosure, in order to identify the properties of the aerogel matrix constituting the aerogel composite or pores in an aerogel particle constituting the aerogel matrix, $T_1$ relaxation time and $T_2$ relaxation time were obtained through the NMR analysis. Here, the "$T_1$ relaxation time" is also called "longitudinal relaxation time" or "spin-lattice relaxation time." The $T_1$ relaxation time may be obtained by an "inversion recovery method" of appropriately applying a sufficiently strong RF pulse to squelch or to actually invert magnetization. The "$T_2$ relaxation time" is called transverse relaxation time, or spin-spin relaxation time, and is determined by molecular characteristics of a saturation fluid in pores of a sample and an interaction of a pore network structure. The $T_2$ relaxation time may be obtained by using a Car-Purcell-Meiboom-Gill (CPMG) echo sequence. Due to structural and chemical interactions in a confined space inside the pores, the fluid saturated in the pores of the sample is more restricted in the movement than fluid molecules in a typical bulk state, and as a result, the $T_1$ relaxation time and the $T_2$ relaxation time are reduced. Particularly, the $T_2$ relaxation time is significantly affected by the molecular characteristics of the saturation fluid inside the pores and the interaction of the pore network structure. However, if a paramagnetic material is present in the sample, the $T_1$ relaxation time and the $T_2$ relaxation time are greatly reduced, but a 1H $T_1/T_2$ ratio at this time is maintained at a similar value regardless of an inclusion concentration of the paramagnetic material (RSC Adv., 2017, 7, 36163-36167 literature). That is, since a $T_1/T_2$ ratio reflects only the information inside the pores excluding a paramagnetic effect, in the present disclosure, information on the pores was obtained from a value of the 1H $T_1/T_2$ ratio in order to identify the characteristics of the pores regardless of the presence or absence of the paramagnetic material in the aerogel sample. In addition, in the present disclosure, in order to identify the degree of hydrophobization inside the pores as well as the structural characteristics (size, complexity, etc.) inside the pores during the NMR analysis, a water ($H_2O$) fluid was used as the saturation fluid.

According to the result of performing the NMR analysis on the aerogel composite of the present disclosure, aerogel particles included in the aerogel composite, by using water ($H_2O$) as a saturation fluid, the ratio $T_1/T_2$ of the $T_1$ relaxation time to the $T_2$ relaxation time is $0.4 \times 10^3$ to $1.0 \times 10^3$, $0.45 \times 10^3$ to $1.0 \times 10^3$, $0.5 \times 10^3$ to $1.0 \times 10^3$, $0.4 \times 10^3$ to $0.95 \times 10^3$, $0.45 \times 10^3$ to $0.95 \times 10^3$, $0.5 \times 10^3$ to $0.95 \times 10^3$, $0.4 \times 10^3$ to $0.9 \times 10^3$, $0.45 \times 10^3$ to $0.9 \times 10^3$, or $0.5 \times 10^3$ to $0.9 \times 10^3$.

Meanwhile, in the present disclosure, the NMR analysis is performed on aerogel powder (aerogel particles) separated from the aerogel composite. At this time, the aerogel powder may be obtained from an aerogel composite prepared in a rectangular shape (e.g., a size of 60 cm×12 cm in width× length, but the size is not limited thereto) or from a sample piece obtained by cutting a portion of the aerogel composite.

Aerogel powder used for analysis in the present disclosure may be prepared through the following process: An aerogel composite having a size of 60 cm×12 cm in width×length was placed in a sealing container, and then repeatedly shaken up and down to apply an impact thereto, thereby inducing separation of aerogel powder. In order to remove a fiber substrate mixed in the separated aerogel powder, the fiber substrate identifiable with the naked eye was primarily removed using a pin set. Thereafter, the aerogel powder was placed in a 100 ml vial and added with distilled water at a weight ratio (powder:distilled water) of approximately 1:130, and then strongly shaken 50 times. Thereby, the fiber substrate sunk to the bottom layer of the vial, and an aggregated mass formed by the clumping of the fiber substrate and the aerogel powder were removed, and only the aerogel powder suspended in an upper portion of the distilled water was carefully obtained. At this time, for sufficient analysis, at least 150 mg of a finally obtained aerogel powder sample is required.

In addition, in the present disclosure, even when heat treatment is performed on the aerogel composite at a high temperature, the ratio of $T_1/T_2$ with respect to aerogel particles after the heat treatment remains at the same level as the ratio of $T_1/T_2$ with respect to aerogel particles before the heat treatment.

Specifically, in the present disclosure, the ratio $T_1/T_2$ of the $T_1$ relaxation time with respect to the $T_2$ relaxation time in NMR analysis using a water solvent performed on aerogel particles after performing heat treatment on the aerogel particles separated from the aerogel composite at a temperature of 200° C. (+5° C.) for 1 hour may be $0.4{\times}10^3$ to $1.0{\times}10^3$, $0.45{\times}10^3$ to $1.0{\times}10^3$, $0.5{\times}10^3$ to $1.0{\times}10^3$, $0.55{\times}10^3$ to $1.0{\times}10^3$, $0.6{\times}10^3$ to $1.0{\times}10^3$, $0.4{\times}10^3$ to $0.95{\times}10^3$, $0.45{\times}10^3$ to $0.95{\times}10^3$, $0.5{\times}10^3$ to $0.95{\times}10^3$, $0.55{\times}10^3$ to $0.95{\times}10^3$, $0.6{\times}10^3$ to $0.95{\times}10^3$, $0.4{\times}10^3$ to $0.9{\times}10^3$, $0.45{\times}10^3$ to $0.9{\times}10^3$, $0.5{\times}10^3$ to $0.9{\times}10^3$, $0.55{\times}10^3$ to $0.9{\times}10^3$, $0.6{\times}10^3$ to $0.9{\times}10^3$, $0.4{\times}10^3$ to $0.85{\times}10^3$, $0.45{\times}10^3$ to $0.85{\times}10^3$, $0.5{\times}10^3$ to $0.85{\times}10^3$, $0.55{\times}10^3$ to $0.85{\times}10^3$, $0.6{\times}10^3$ to $0.85{\times}10^3$, $0.4{\times}10^3$ to $0.8{\times}10^3$, $0.45{\times}10^3$ to $0.8{\times}10^3$, $0.5{\times}10^3$ to $0.8{\times}10^3$, $0.55{\times}10^3$ to $0.8{\times}10^3$, or $0.6{\times}10^3$ to $0.8{\times}10^3$.

In addition, in the present disclosure, the ratio of $T_1/T_2$ with respect to the aerogel particles after performing heat treatment the aerogel composite at a temperature of 200° C. for 1 hour may be 0.8 times to 1.2 times, 0.85 times to 1.2 times, 0.8 times to 1.15 times, 0.85 times to 1.15 times, 0.8 times to 1.1 times, or 0.85 times to 1.1 times the ratio of $T_1/T_2$ with respect to the aerogel particles before the heat treatment.

The temperature (or temperature range) described herein in relation to heat treatment or the like accommodates a margin of error of approximately ±5° C.

The aerogel composite according to the present disclosure includes pores having a small diameter size at a limited ratio, has excellent pore strength, and has a very low degree of pore contraction even when heated at a high temperature due to sufficient hydrophobization not only on the surface of the aerogel composite, but also inside an aerogel matrix, particularly inside pores, and accordingly, may maintain high heat insulation even when exposed to a high-temperature environment.

If a pore diameter in aerogel is 20 nm or less, the size of pores is small, so that there is a disadvantage in that surface modification should be performed for a long period of time using a highly concentrated hydrophobization modifier in order to achieve sufficient hydrophobization by allowing a hydrophobization agent to be sufficiently diffused into the pores during the surface modification. Accordingly, in the present disclosure, pores having a pore diameter of 5 nm to 20 nm are included at a limited ratio.

In the present disclosure, the aerogel may include pores having a pore diameter of 5 nm to 20 nm at 25% or less, or 10% to 25%, of the pore volume of a skeletal structure, but the present disclosure is not limited thereto.

In the aerogel composite of the present disclosure, a moisture impregnation ratio (wt %) represented by Equation 1 below may be 4 wt % or less.

Moisture impregnation rate (wt %) = [Equation 1]

$$\{(\text{Weight of a sample after impregnation} -$$

$$\text{Weight of the sample before impregnation})/$$

$$(\text{Weight of the sample before impregnation})\} \times 100$$

In Equation 1 above, the moisture impregnation rate may be calculated by floating a sample of 100 mm×100 mm in size of the aerogel composite on distilled water at 21±2° C., and then placing a 6.4 mm mesh screen on top of the sample to impregnate the sample by sinking the same to 127 mm below the surface of the water, and after 15 minutes, removing the mesh screen and when the sample rises to the surface, picking the sample up with a clamp and hanging the sample vertically for 60±5 seconds, and then measuring the weight retention rate by measuring the weight before and after the impregnation, respectively. Here, the lower the moisture impregnation rate, the higher the degree of hydrophobicity of the aerogel composite.

In the present disclosure, surface water repellency and cross-section water repellency for respectively evaluating the degree of hydrophobicity on the surface of the aerogel composite and the degree of hydrophobicity inside the aerogel composite may all be measured using Equation 1 above, and may be measured by varying samples used at this time. Specifically, in the present disclosure, when measuring the moisture impregnation rate, a moisture impregnation rate measured using a relatively large aerogel composite sample having a size of 100 mm×100 mm, which is similar to the size of a commercially available aerogel composite, is intended to represent water repellency on the surface of the aerogel composite. The low surface moisture impregnation rate described above means that the degree of hydrophobicity on the surface of the aerogel composite is high. In the present disclosure, the surface water repellency of the aerogel composite calculated through Equation 1 above may be 4 wt % or less, or 3.5 wt % or less.

In addition, in the present disclosure, when measuring the moisture impregnation rate, a moisture impregnation rate measured using an aerogel composite sample cut to a size of a relatively small size, for example, a size of 10 mm×10 mm, is intended to represent water repellency on the cross-section of the aerogel composite. The low cross-section moisture impregnation rate described above means that the degree of hydrophobicity is high not only on the surface of the aerogel composite, but also inside the aerogel composite. In the present disclosure, the cross-section water repellency of the aerogel composite calculated through Equation 1 above may be 4 wt % or less, or 3 wt % or less, or 2 wt % or less.

In addition, the aerogel composite of the present disclosure may have high hydrophobicity even when heated at a high temperature of 200° C. In the present disclosure, the surface water repellency measured according to Equation 1 above after heating the aerogel composite at 200° C. for 1 hour may be 10 wt % or less, or 5 wt % or less.

In addition, the aerogel composite of the present disclosure may have high hydrophobicity even when heated at a high temperature of 200° C. In the present disclosure, the cross-section water repellency rate measured according to Equation 1 above after heating the aerogel composite at 200° C. for 1 hour may be 10 wt % or less, or 5 wt % or less.

In addition, the aerogel composite of the present disclosure may have a moisture impregnation rate of 2.5 wt % or less, which is represented by Equation 2 below. Here, the water vapor absorption rate represents the amount of water in wt %, the water absorbed by the aerogel composite or remaining in the aerogel composite after exposing the aerogel composite to water vapor under a specific measurement condition. In the present disclosure, the water vapor absorption rate may be measured by a known method of ASTM C1104.

$$\begin{aligned} \text{Water vapor absorption rate (wt \%) =} \quad & \text{[Equation 2]} \\ \{(\text{Weight of sample after experiment} - & \\ \text{Weight of sample before experiment})/ & \\ (\text{Weight of sample before experiment})\} \times 100 & \end{aligned}$$

In addition, in the present disclosure, the aerogel composite may have a thermal conductivity at room temperature (23±2° C.) of 30.0 mW/mK or less, 25.0 mW/mK or less, or 20.0 mW/mK or less, and when in this range, there is an effect of securing the heat insulation of the aerogel composite to the maximum.

In the present disclosure, the aerogel composite may have a thermal conductivity at a high temperature (150° C.) of 35.0 mW/mK or less, 30.0 mW/mK or less, or 25.0 mW/mK or less, and when in this range, there is an effect of securing the heat insulation of the aerogel composite to the maximum.

In the present disclosure, the aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a sample according to the ASTM C165 specifications.

In the present disclosure, the aerogel composite has a tensile strength of 30 N/cm² to 60 N/cm², 40 N/cm² to 55 N/cm², or 45 N/cm² to 55 N/cm², and may have excellent flexibility. Here, the tensile strength may be measured by preparing a sample according to the ASTM D638 specifications.

In the present disclosure, the density of the aerogel composite may be 0.05 g/cm³ to 0.50 g/cm³, 0.05 g/cm³ to 0.35 g/cm³, 0.05 g/cm³ to 0.30 g/cm³, 0.10 g/cm³ to 0.35 g/cm³, 0.10 g/cm³ to 0.30 g/cm³, 0.15 g/cm³ to 0.35 g/cm³, or 0.15 g/cm³ to 0.30 g/cm³, but is not limited thereto.

In the present disclosure, the aerogel composite may be formed by the steps of preparing a silica sol, impregnating a fiber substrate with the silica sol, followed by preforming gelation, aging, surface modification, and drying. Hereinafter, each step will be described. However, the specific preparation processes or examples thereof described herein are not intended to be limited to any particular type of aerogel composite or preparation method thereof. The present specification may include any aerogel composite formed by any associated preparation method known to those skilled in the art.

Preparation of Silica Sol

In the present disclosure, a silica precursor composition and a catalyst composition may be mixed to prepare a silica sol.

In the present disclosure, the silica precursor composition may include water and/or a polar organic solvent in a silica precursor.

In the present disclosure, the silica precursor may be used without limitation as long as it is a precursor which may be used to form a silica aerogel, and for example, may be a silicon-containing alkoxide-based compound. Specifically, the silica precursor may be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, or tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, in the present disclosure, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, in the present disclosure, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, may be easily applied according to a user's reaction conditions. In addition, there is an advantage in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

In the present disclosure, the silica precursor composition may further include a silicate containing a hydrophobic group, thereby imparting elasticity to an aerogel structure to increase pore strength, and hydrophobization may also be induced inside an aerogel matrix. In the present disclosure, the type of the silicate including a hydrophobic group is not limited as long as it is an alkyl silane compound including an alkyl group inducing hydrophobization and a silane functional group capable of reacting with an —Si—O— functional group of a wet gel, but specific examples thereof may include one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES), but are not limited thereto.

In the present disclosure, when the silicate including a hydrophobic group is included in the silica precursor composition, the silicate including a hydrophobic group and the tetraalkyl silicate may be included in a molar ratio (molar ratio of silicate including a hydrophobic group:tetraalkyl silicate) of 2:98 to 98:2. Within the above range, the strength and heat insulation performance of aerogel may be secured with high efficiency, and the structure does not collapse even when the aerogel composite is exposed to a high temperature environment, so that degradation in the heat insulation performance may be prevented.

In the present disclosure, the silica concentration of the silica precursor composition may be 10 kg/m³ to 100 kg/m³, 20 kg/m³ to 80 kg/m³, 30 kg/m³ to 70 kg/m³, 30 kg/m³ to 60 kg/m³, or 35 kg/m³ to 45 kg/m³, but is not limited thereto. In the present disclosure, the silica concentration is the concentration of the silica included in the silica precursor with respect to the silica precursor composition, and may be suitably adjusted by varying the contents of a silica precursor, an organic solvent, and water.

In the present disclosure, the silica precursor may be used in an amount such that the content of the silica included in the silica sol is to be 0.1 wt % to 30 wt %, but is not limited thereto. If the content of the silica satisfies the above range, mechanical physical properties, flexibility in particular, of the aerogel composite may be secured at an excellent level while having an improved heat insulation effect.

In the present disclosure, the polar organic solvent may include an alcohol, and specific examples thereof may include a monohydric alcohol such as methanol, ethanol, isopropanol, or butanol, a polyhydric alcohol such as glycerol, ethylene glycol, propylene glycol, diethylene glycol, dipropylene glycol, or sorbitol, or a combination thereof, but other solvents as known to those skilled in the art may also be used without limitation. In the present disclosure, when considering the miscibility with water and aerogel, the polar organic solvent may be a monohydric alcohol having 1 to 6 carbon atoms such as methanol, ethanol, isopropanol, or butanol, and may be, for example, ethanol.

In the present disclosure, the polar organic solvent may be used in an appropriate amount by those skilled in the art in consideration of the degree of hydrophobicity in an aerogel composite to be finally prepared while promoting a surface modification reaction.

In the present disclosure, when preparing the silica precursor composition, the silica precursor and the organic solvent may be mixed at a weight ratio of 1:0.1 to 5, or 1:0.5 to 3 to prepare the composition, the present disclosure is not limited thereto. However, if the silicate containing a hydrophobic group is included in the silica precursor composition, a mixture of the silicate containing a hydrophobic group and a tetraalkyl silicate and an organic solvent may be mixed in the above weight ratio.

In addition, in the present disclosure, when preparing the silica precursor composition, the silica precursor and water may be mixed and in a molar ratio of 1:0.5 to 10, 1:1 to 8, or 1:3 to 6 to prepare the composition, but the present disclosure is not limited thereto. However, if the silicate containing a hydrophobic group is included in the silica precursor composition, a mixture of the silicate containing a hydrophobic group and a tetraalkyl silicate and water may be mixed in the above molar ratio.

In the present disclosure, the silica precursor composition may further include an acid catalyst, and specifically, may further include an acid catalyst when applying an alkoxy silane-based compound, which is not a hydrolysate, as a precursor. At this time, the acid catalyst may be used without limitation as long as it is an acid catalyst which allows the pH to be 3 or less, and as an example, a hydrochloric acid, a nitric acid, a sulfuric acid, a phosphoric acid, an oxalic acid, or an acetic acid may be used. At this time, the acid catalyst may be added in an amount which allows the pH of the sol to be 3 or less, and may be added in the form of an aqueous solution in which the acid catalyst is dissolved in an aqueous solvent.

In the present disclosure, the catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide (Ca(OH)$_2$), ammonia (NH$_3$), ammonium hydroxide (NH$_4$OH; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, pyridine, a combination thereof, or the like, but are not limited thereto.

In the present disclosure, the base catalyst may be included in an amount such that the pH of the sol is to be 5 to 9. If the pH of the sol is out of the above range, gelation may not be easily achieved or a gelation rate may be too low, so that processability may be degraded. In addition, since the base may be precipitated when introduced in a solid phase, the base may be added in a solution phase diluted by an aqueous solvent or the above-described organic solvent. At this time, the dilution ratio of the base catalyst and the organic solvent, specifically an alcohol, may be 1:4 to 1:100 based on a volume basis, but is not limited thereto.

In the present disclosure, in order to prepare the silica sol, the silica precursor composition and the catalyst composition may be mixed at a volume ratio of 1:0.01 to 10.0, 1:0.01 to 5.0, or 1:0.01 to 2.0, but is not limited thereto.

In the present disclosure, if necessary, an additive may be further added to the silica sol. At this time, all known additives which may be added when preparing aerogel may be applied as the additive, and for example, an additive such as an opacifying agent and a flame retardant may be used.

In the present disclosure, the additive may be added in an amount of 0.1 wt % to 10 wt %, 0.1 wt % to 7 wt %, 0.5 wt % to 7 wt %, or 0.5 wt % to 5 wt % based on the silica content of the aerogel, but is not limited thereto.

Gelation of Silica Sol

In the present disclosure, after the silica sol is impregnated into the substrate, the silica sol may be subjected to gelation.

In the present disclosure, the impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. At this time, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

In the present disclosure, the temperature of the silica sol in the reaction vessel may be 1° C. to 40° C., 20° C. to 40° C., 25° C. to 40° C., 30° C. to 40° C., or 35° C. to 45° C. When the temperature of the silica sol in the reaction vessel satisfies the above range, the above-described viscosity range of the catalyzed sol may be more easily achieved, and even the retention time is relatively short, a desired level of viscosity range may be achieved.

In the present disclosure, the catalyzed silica sol may be impregnated into the substrate at a volume ratio of 0.1 to 10:1 (catalyzed silica sol:substrate), a volume ratio of 0.1 to 1:1, a volume ratio of 0.3 to 1:1, a volume ratio of 0.5 to 1:1, or a volume ratio of 0.6 to 1:1, but is not limited thereto.

In the present disclosure, when preparing the silica sol, the ratio of the silica precursor composition, the organic solvent, and the water may be adjusted, and the volume ratio between the silica sol and the substrate in the impregnation step may be adjusted to adjust the density ratio of the fiber substrate and the aerogel in the aerogel composite. In the present disclosure, the density ratio of the fiber substrate and the aerogel may be 1:0.6 to 1 in terms of increasing the strength of the aerogel composite.

In the present disclosure, the silica sol impregnated into the substrate may be subjected to gelation simultaneously with the impregnation process of the silica sol or sequentially after the impregnation process.

In the present disclosure, the substrate impregnated with the catalyzed sol may be subjected to gelation on a moving element such as a conveyor belt.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

In the present disclosure, the gelation may be performed under an ambient atmosphere temperature of 20° C. to 40° C., 20° C. to 30° C., 25° C. to 40° C., 30° C. to 40° C., or 35° C. to 40° C., and in some examples the gelation is performed under an ambient atmosphere temperature of 30° C. to 40° C. or 35° C. to 40° C. in terms of increasing the strength of pores in the aerogel composite, but the present disclosure is not limited thereto.

In the present disclosure, the gelation may be performed for 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but may be suitably adjusted in consideration the gelation temperature, the amount of silica sol, and the like.

Aging of Wet Gel Composite which has Gelled

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

In the present disclosure, the aging step may be performed by leaving the wet gel composite which has gelled to stand as it is at an appropriate temperature, or may be performed by adding a cross-linking-promoting compound.

In the present disclosure, the aging step may be performed by adding a solution in which a base catalyst such as sodium hydroxide (NaOH), potassium hydroxide (KOH), ammonium hydroxide (NH$_4$OH), triethylamine, pyridine, or the like is diluted to a concentration of 1% to 10% in an organic solvent, in the presence of the wet gel composite. In this case, a Si—O—Si bonding in aerogel is induced to the maximum to allow the network structure of a silica gel to be firmer, so that there is an effect of facilitating the maintenance of the pore structure in a drying process be performed later. At this time, the organic solvent may be the alcohol described above, and specifically, may include ethanol.

In addition, in the present disclosure, in the aging step, a mixed solution of an alkoxy silane-based compound and an alcohol may be added to provide an additional sol precursor source as well as unreacted sol to induce additional gelation in the silica gel network structure, thereby further strengthening the gel structure. At this time, the alkoxy silane-based compound may be included in an amount of 0.5 parts by weight to 9.5 parts by weight, 1.0 part by weight to 9.5 parts by weight, or 1.5 parts by weight to 9.5 parts by weight based on the total 100 parts of the aging solution.

In the present disclosure, the alkoxy silane-based compound may include one or more selected from the group consisting of tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, methyltrimethoxysilane (MTMS), methyltriethoxysilane (MTES), trimethylethoxysilane (TMES), trimethylsilanol (TMS), trimethylchlorosilane (TMCS), ethyltriethoxysilane (ETES), dimethyldiethoxysilane (DMDEOS), and phenyltriethoxysilane.

In addition, in the present disclosure, the alcohol may specifically be a monohydric alcohol such as methanol, ethanol, isopropanol, or butanol, or a polyhydric alcohol such as glycerol, ethylene glycol, propylene glycol, diethylene glycol, dipropylene glycol, or sorbitol, for example a monohydric alcohol having 1 to 6 carbon atoms such as methanol, ethanol, isopropanol, or butanol, and may be, for example, ethanol, but is not limited thereto.

In the present disclosure, the aging step may be performed by leaving the wet gel composite which has gelled to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 1 hour to 5 hours to strengthen the pore structure, and within this range, it is possible to prevent an increase in production costs by preventing a loss of the solvent due to evaporation while preventing a decrease in productivity.

In addition, in the present disclosure, the aging step may be performed by performing primary aging of leaving the wet gel composite which has gelled at 30° C. to 80° C. for 0.1 hours to 5 hours to strengthen the pore structure, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours, by adding a solution in which the above-described basic catalyst is diluted in an organic solvent.

In addition, in the present disclosure, in order to strengthen the pore structure as well as to hydrophobize the inside of the pores, the aging step may be performed by performing primary aging as described above, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours by adding a mixed solution of an alkoxy silane-based compound and an alcohol.

In the present disclosure, the aging step may be performed in a separate reaction vessel after recovering the wet gel composite which has gelled, or may be performed inside the reaction vessel in which the gelation step has been performed.

Surface Modification of Aged Wet Gel Composite

In the present disclosure, if necessary, a surface modification step of hydrophobizing the surface of the wet gel composite obtained by the gelation as described above or the surface of the aged wet gel composite may be further included in the presence of a surface modifier.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, or 3-aminopropyltriethoxysilane, a siloxane-based compound such as polydimethyl siloxane, polydiethyl siloxane, or octamethyl cyclotetra siloxane, a silanol-based compound such as trimethylsilanol, triethylsilanol, triphenyl silanol, or t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, or 1,2-diisopropyldisilazane, or a combination thereof, but are not limited thereto.

In the present disclosure, the surface modifier may be used in a solution phase diluted in an organic solvent. Here, the organic solvent may be an alcohol (an organic solvent), and at this time, the surface modifier may be diluted to 1 vol % to 15 vol % based on the total volume of the diluted solution.

In addition, in the present disclosure, the surface modifier may be added in an amount of 0.01 vol % to 90 vol % with respect to the wet gel composite for a sufficient surface modification effect, but is not limited thereto.

In the present disclosure, the surface modification step may be performed at a temperature of 50° C. to 90° C. or 50° C. to 80° C. for 1 hour to 24 hours, or 6 hours to 12 hours, but is not limited thereto.

Drying Step

In the present disclosure, a drying step of drying the surface-modified wet gel composite to obtain an aerogel composite may be included.

In the present disclosure, the drying is performed as a process of removing only the solvent while maintaining the pore structure of the aged gel, and may be performed, for example, by supercritical drying or normal-pressure drying.

In the present disclosure, the supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby preparing an aerogel composite, but the present disclosure is not limited thereto.

In addition, in the present disclosure, the normal-pressure drying process may be performed according to a typical method such as hot air drying or IR drying at a temperature of 70° C. to 200° C. and under a normal pressure (1±0.3 atm) for 30 minutes to 4 hours, but is not limited thereto.

In addition to the above process, the present disclosure includes acidification of a basic metal oxide precursor (e.g., sodium silicate) in water to prepare a hydrogel. A salt by-product may be removed from a silicic acid precursor by ion exchange and/or subsequent washing of the formed gel with water. Removing the water from pores of the gel may be performed through exchange with a polar organic solvent, such as ethanol, methanol, or acetone. Subsequently, the liquid phase in the gel is at least partially extracted using innovative processing and extraction techniques.

In addition to the above process, the present disclosure includes reducing damage capillary force at a solvent/pore interface by chemical transformation of a matrix material in a wet gel state through conversion of a surface hydroxyl group to hydrophobic trimethylsilylether, thereby enabling liquid phase extraction from a gel material at a temperature and a pressure below the critical point of the solvent.

In addition to the above process, in the present disclosure, a liquid (solvent) in the gel material is frozen at a lower temperature and a sublimation process is subsequently performed, so that the solvent may be removed from the gel material. Such removal or drying of the solvent from the gel material is understood to be within the scope of the present disclosure. Such removal largely preserves the gel structure, resulting in producing an aerogel with unique properties.

The aerogel composite provided in the present disclosure may be usefully used as a heat insulation material, thermal insulation material, or non-combustible material for aircraft, ships, automobiles, electronic devices, and batteries, as well as for plant facilities for heat and cold insulation, such as piping or industrial furnaces of various industrial facilities.

In accordance with an aspect of the present disclosure, a heat insulation member includes the aerogel composite provided in the present disclosure.

In the present disclosure, the heat insulation member may include the aerogel composite as described above, and a support member positioned on at least one surface of an upper surface of the aerogel composite or a lower surface thereof.

In the present disclosure, the support member may be, for example, a film-like support member, a sheet-like support member, a foil-like support member, a porous support member, and the like.

In the present disclosure, the film-like support member is formed by molding a polymer raw material into a thin film, and examples thereof may include an organic film of such as PET and polyimide, a glass film, and the like (including a metal-deposited film).

In the present disclosure, the sheet-like support member is formed by molding an organic, inorganic, or metallic fibrous raw material, and examples thereof may include paper, a non-woven fabric (including a glass mat), an organic fiber fabric, glass cloth, and the like.

In the present disclosure, the foil-like support member is formed by molding a metal raw material into a thin film, and examples thereof may include an aluminum foil, a copper foil, or the like.

In the present disclosure, the porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), or the like.

In the present disclosure, the thickness of the support member is not particularly limited, and may be, for example, 0.1 μm to 100 μm, or 1 μm to 50 μm.

In the present disclosure, the heat insulation member may also be applied to applications such as a heat insulation material, thermal insulation material, or non-combustible material in the construction field, aviation field, automobile field, batteries, home appliances, semiconductor field, industrial facilities, and the like.

In accordance with the present disclosure, a battery module or a battery pack comprises the aerogel composite provided in the present disclosure.

A battery module comprises a module case having an internal space and one or more battery cells present within the internal space. The number of battery cells accommodated in the module case is not particularly limited and may be adjusted according to the use of the battery module. The battery cells accommodated in the module case may be electrically connected to each other. The type of battery cells accommodated in the module case are not necessarily limited. For example, the battery module may comprise cylindrical, prismatic, or pouch case battery cells.

The battery module may comprise an aerogel composite according to the present disclosure within the module case of the battery module. The aerogel composite may be positioned between battery cells accommodated within the module case. The aerogel composite may be positioned along a periphery of the module case, between the module case and the plurality of battery cells. The aerogel composite positioned within the module case may act as an insulator and reduce thermal propagation in the battery module, improving the safety of the battery module.

A battery pack may comprise one or more of the battery modules described above. In the battery pack, the battery modules may be electrically connected to each other. The battery pack may comprise the aerogel composite according to the present disclosure. For example, the aerogel composite may be positioned between battery modules of the battery pack. The aerogel composite may also at least partially surround the plurality of battery modules in the battery pack. The aerogel composite may act as an insulating material in the battery pack, reducing thermal propagation and improving the safety of the battery pack.

Hereinafter, aspects of the present disclosure will be described in detail with reference to the following examples. However, the following examples are illustrative of aspects of the present disclosure, and the contents of the present disclosure are not limited by the following examples.

EXAMPLES

[Example 1] Preparation of Aerogel Composite

Methyltriethoxysilane (MTES) and TEOS were mixed in a molar ratio of 1:1 to prepare a silica precursor composition. The silica precursor composition and water were mixed at a molar ratio of 1:5, and ethanol having a weight ratio of 1:2 with respect to the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with respect to the silica sol was added to prepare a catalyzed silica sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The prepared wet gel composite was added with 109% of a prepared tetraethylorthosilicate (TEOS) solution (solvent:ethanol) of 1.7 wt % as an aging solution based on the volume of the wet gel composite and was subjected to aging in an oven at 75° C. for 2 hours. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Example 2] Preparation of Aerogel Composite

Methyltriethoxysilane (MTES) and TEOS were mixed in a molar ratio of 7:3 to prepare a silica precursor composition. The silica precursor composition and water were mixed at a molar ratio of 1:5, and ethanol having a weight ratio of 1:2 with respect to the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with respect to the silica sol was added to prepare a catalyzed silica sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 30 minutes. Thereafter, the wet gel composite which has gelled was added with 109% of a prepared tetraethylorthosilicate (TEOS) solution (solvent:ethanol) of 3.4 wt %, based on the volume of the wet gel composite and was subjected to secondary aging in an oven at 75° C. for 2 hours. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 8 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Example 3] Preparation of Aerogel Composite

Methyltriethoxysilane (MTES) and TEOS were mixed in a molar ratio of 7:3 to prepare a silica precursor composition. The silica precursor composition and water were mixed at a molar ratio of 1:5, and ethanol having a weight ratio of 1:2 with respect to the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with respect to the silica sol was added to prepare a catalyzed silica sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. After the gelation was completed, stabilization was performed at room temperature (25° C.) for 10 minutes, and then primary aging was performed in an oven at 70° C. for 30 minutes. Thereafter, a mixture of ethanol and ammonia water (volume ratio of 98:2) was prepared and added to the wet gel composite which has gelled in an amount of 1.6 times the volume of the silica sol, and then secondary aging was performed in an oven at 70° C. for 1 hour. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 10 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Example 4] Preparation of Aerogel Composite

Methyltriethoxysilane (MTES) and TEOS were mixed in a molar ratio of 7:3 to prepare a silica precursor composition. The silica precursor composition and water were mixed at a molar ratio of 1:5, and ethanol having a weight ratio of 1:2 with respect to the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with respect to the silica sol was added to prepare a catalyzed silica sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 30 minutes. Thereafter, the wet gel composite which has gelled was added with 109% of a solution, which was prepared by diluting 2.9 wt % of methyltriethoxysilane (MTES) in ethanol with a water content of 10 wt %, based on the volume of the wet gel composite, and then was subjected to secondary aging in an oven at 75° C. for 2 hours. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 10 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Example 5] Preparation of Aerogel Composite

Methyltriethoxysilane (MTES) and TEOS were mixed in a molar ratio of 7:3 to prepare a silica precursor composition. The silica precursor composition and water were mixed at a molar ratio of 1:5, and ethanol having a weight ratio of 1:2 with respect to the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with respect to the silica sol was added to prepare a catalyzed silica sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. After the gelation was completed, stabilization was performed at room temperature (25° C.) for 10 minutes, and then primary aging was performed in an oven at 70° C. for 30 minutes. Thereafter, a mixture of ethanol and ammonia water (volume ratio of 98:2) was prepared and added to the wet gel composite which has gelled in an amount of 1.6 times the volume of the silica sol, and then secondary aging was performed in an oven at 70° C. for 1 hour. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 8 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Comparative Example 1] Preparation of Aerogel Composite

Methyltriethoxysilane (MTES) and TEOS were mixed in a molar ratio of 9:1 to prepare a silica precursor composition. The silica precursor composition and water were mixed at a molar ratio of 1:5, and ethanol having a weight ratio of 1:2 with respect to the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with respect to the silica sol was added to prepare a catalyzed silica sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Comparative Example 2] Preparation of Aerogel Composite

Tetraethyl orthosilicate (TEOS) and ethanol were mixed in a weight ratio of 1:0.5 and water having a molar ratio of 1:4 with respect to TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:0.8 with respect to the hydrated TEOS solution was added to prepare a silica sol. A base catalyst solution (5 wt % of NaOH aqueous solution) having a volume ratio of 99:1 with respect to the silica sol was added to prepare a catalyzed sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 10 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Comparative Example 3] Preparation of Aerogel Composite

Tetraethyl orthosilicate (TEOS) and ethanol were mixed in a weight ratio of 1:0.5 and water having a molar ratio of 1:4 with respect to TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:0.8 with respect to the hydrated TEOS solution was added to prepare a silica sol. A base catalyst solution (5 wt % of NaOH aqueous solution) having a volume ratio of 99:1 with respect to the silica sol was added to prepare a catalyzed sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 4 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor.

Thereafter, $CO_2$ was vented over the course of 2 hours to prepare hydrophobic silica aerogel composite.

[Comparative Example 4] Preparation of Aerogel Composite

Tetraethyl orthosilicate (TEOS) and ethanol were mixed in a weight ratio of 1:0.5 and water having a molar ratio of 1:4 with respect to TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:0.8 with respect to the hydrated TEOS solution was added to prepare a silica sol. A base catalyst solution (5 wt % of NaOH aqueous solution) having a volume ratio of 99:1 with respect to the silica sol was added to prepare a catalyzed sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 10 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Comparative Example 5] Preparation of Aerogel Composite

Tetraethyl orthosilicate (TEOS) and ethanol were mixed in a weight ratio of 1:0.5 and water having a molar ratio of 1:4 with respect to TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:0.8 with respect to the hydrated TEOS solution was added to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with respect to the silica sol was added to prepare a catalyzed silica sol. After filling 33.3 L of the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber).

The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The prepared wet gel composite was added with 109% of a solution as an aging solution, which was prepared by diluting 2.4 wt % of ammonium hydroxide ($NH_4OH$) in ethanol with a water content of 10 wt %, based on the volume of the wet gel blanket, and was aged for 1 hour at a temperature of 75° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 6 hours. The silica wet gel composite was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare hydrophobic silica aerogel composite.

[Experimental Example 1] Measurement of Density and Pore Size-Specific Distribution 1. Density For the silica aerogel composite produced in each of Examples and Comparative Examples, five samples having a size of 10 cm×10 cm were prepared, and then the weight of each sample was measured, and the thickness of each sample was measured using HFM 436 equipment of NETZSCH Co., Ltd. The measured weight and thickness, and the size were used to calculate the density, and the average density of the five samples was determined as the final density, and the results are shown in Table 1 below.

2. Volume Ratio (%) of Effective Pores with Pore Diameter of 5 Nm to 20 nm

For the silica aerogel composite produced in each of Examples and Comparative Examples, the amount of nitrogen absorption/desorption according to partial pressure ($0.11<p/p0<1$) was analyzed using the ASAP 2010 equipment of Micrometrics Co., Ltd. The volume ratio of pores (effective pores) having a pore diameter in the numerical range of 5 nm to 20 nm in the measured pore volume was calculated, and the results are shown in Table 1 below.

TABLE 1

| Classification | Density (g/cc) | Effective pore volume ratio (%) |
|---|---|---|
| Example 1 | 0.211 | 17% |
| Example 2 | 0.221 | 20.1% |
| Example 3 | 0.199 | 24.5% |
| Example 4 | 0.218 | 16.4% |
| Example 5 | 0.205 | 14.5% |
| Comparative Example 1 | 0.215 | 28.3% |
| Comparative Example 2 | 0.189 | 28% |
| Comparative Example 3 | 0.199 | 30.1% |

US 12,606,446 B2

25

TABLE 1-continued

| Classification | Density (g/cc) | Effective pore volume ratio (%) |
|---|---|---|
| Comparative Example 4 | 0.195 | 28.8% |
| Comparative Example 5 | 0.211 | 32.2% |

[Experimental Example 2] NMR Analysis of Aerogel Structure

1. Room-Temperature NMR Analysis

In order to perform NMR analysis on aerogel particles included in the aerogel composites obtained in Examples 1 to 5 and Comparative Examples 1 to 5, the aerogel composites of Examples 1 to 5 and Comparative Examples 1 to 5 were first prepared in a size of 60 cm×12 cm in width×length. Each aerogel composite was placed in a sealable vinyl container, and repeatedly shaken up and down to apply an impact thereto, thereby intentionally inducing separation of aerogel powder (aerogel particles). A fiber substrate mixed in the obtained aerogel powder and identifiable with the naked eye was removed using a pin set. Thereafter, in order to further remove the fiber substrate finely mixed in the separated powder for more precise analysis, the aerogel powder was placed in a 100 mL vial, added with distilled water at a weight ratio of powder: distilled water of approximately 1:130, and then strongly shaken up and down 50 times. Thereafter, the fiber substrate sunk to the bottom layer of the vial was removed, and a mass formed by aggregation of the fiber substrate and the aerogel powder was also removed. 150 mg of the aerogel powder having no aggregate was carefully obtained and dried in an oven (Samheung Energy Co., Ltd., SH-VDO-08N) for 24 hours or more under the condition of 105° C. The dried aerogel powder was stored for 5 hours or more using a thermo-hygrostat (JEIO TECH, TH3-PE) under the conditions of a temperature of 25° C. and a humidity of 40% to allow water to be adsorbed and saturated in aerogel pores. The aerogel powder in which the water was saturated in the pores was transferred to a 5 mm NMR tube, sealed, and then subjected to an NMR experiment. As an NMR experiment device, a 600 MHz NMR (Bruker, Avance Neo) and a diffusion probe were used. As an experimental parameter for measuring the $T_1$ relaxation time, a pulse sequence: a $T_1$ inversion recovery method, d1=10 seconds, ns=8, and vdlist are as shown in Table 2 below. As an experimental parameter for measuring the $T_2$ relaxation time, a pulse sequence: Car-Purcell-Meiboom-Gill (CPMG) method, d1=10 second, ns=8, ds=16, d20-0.000150 seconds, and vclist are as shown in Table 3 below. The $T_1$ relaxation time and the $T_2$ relaxation time for each sample which are obtained through the above-described experiment, and the ratio $T_1/T_2$ thereof are shown in Table 4 below. In Table 4 below, the result values of the $T_1$ and $T_2$ relaxation time are represented as an average value after repeatedly performing the experiment three times.

26

TABLE 2

| vdlist | 1 | 2 | 3 | 4 | 5 | 6 | 7 8 9 10 | 11 | 12 |
|---|---|---|---|---|---|---|---|---|---|
| Delay time | 0.01 | 0.04 | 0.09 | 0.16 | 0.25 | 0.49 | 1 2 4 9 | 16 | 25 |

TABLE 3

| vclist | 1 | 2 | 3 | 4 | 5 | 6 | 7 | 8 | 9 10 | 11 | 12 | 13 | 14 |
|---|---|---|---|---|---|---|---|---|---|---|---|---|---|
| Loop count | 0 | 1 | 2 | 3 | 4 | 5 | 6 | 7 | 8 10 | 12 | 14 | 16 | 32 |

TABLE 4

| | $T_1$ (sec) | $T_2$ (sec) | $T_1/T_2$ (*10^3) |
|---|---|---|---|
| Example 1 | 1.463 | 2.8 | 0.52 |
| Example 2 | 1.34 | 2.2 | 0.61 |
| Example 3 | 1.482 | 2.19 | 0.68 |
| Example 4 | 1.38 | 1.7 | 0.81 |
| Example 5 | 1.29 | 1.43 | 0.90 |
| Comparative Example 1 | 1.45 | 1.07 | 1.36 |
| Comparative Example 2 | 1.3 | 0.922 | 1.41 |
| Comparative Example 3 | 1.48 | 1.16 | 1.28 |
| Comparative Example 4 | 1.22 | 0.8 | 1.53 |
| Comparative Example 5 | 1.51 | 1.19 | 1.27 |
| Bulk $H_2O$ | 2.83 | 2.81 | |

As shown in Table 4 above, according to the result of performing the NMR analysis using a water solvent on the aerogel composites of Examples 1 to 5 according to the present disclosure, it has been confirmed that the ratio of $T_1/T_2$ is $0.4\times10^3$ to $1.0\times10^3$.

2. High-Temperature NMR Analysis

The following experiment was performed to confirm whether there is contraction of a pore structure or a change in the degree of hydrophobicity on the surface of an aerogel composite or inside pores, if high-temperature heat treatment similar to normal pressure drying is performed on the aerogel composites obtained in Examples 1 to 5 and Comparative Examples 1 to 5. Specifically, the aerogel composites of Examples 1 to 5 and Comparative Examples 1 to 5 were prepared in a size of 60 cm×12 in width×length, and aerogel powder was obtained from each of the aerogel composites in the same manner as in the room-temperature NMR analysis of 1 above. The aerogel powder was heat-treated at a temperature of 200° C. for 1 hour, and the $T_1$ relaxation time and the $T_2$ relaxation time for each sample were measured through NMR analysis, and then a ratio $T_1/T_2$ thereof was calculated and shown in Table 5 below. In addition, a ratio of the ratio of $T_1/T_2$ obtained after the heat treatment to the ratio of $T_1/T_2$ obtained before the heat treatment (denoted as "after heat treatment/before heat treatment) was calculated, and the results are shown together in Table 5.

TABLE 5

| | $T_1/T_2(*10^3)$ | After heat treatment/before heat treatment |
|---|---|---|
| Example 1 | 0.57 | 1.09 |
| Example 2 | 0.62 | 1.02 |
| Example 3 | 0.64 | 0.95 |
| Example 4 | 0.8 | 0.99 |
| Example 5 | 0.78 | 0.86 |
| Comparative Example 1 | 2.94 | 0.46 |
| Comparative Example 2 | 3.22 | 0.44 |
| Comparative Example 3 | 2.35 | 0.54 |
| Comparative Example 4 | 2.16 | 0.71 |
| Comparative Example 5 | 1.70 | 0.75 |
| Bulk H2O | 2.94 | |

As shown in Table 5 above, according to the result of performing heat treatment on the aerogel composites of Examples 1 to 5 according to the present disclosure at a high temperature of 200° C., and then performing the NMR analysis using a water solvent on the aerogel composites, it has been confirmed that the ratio of $T_1/T_2$ is also at a level of $0.4\times10^3$ to $1.0\times10^3$. In addition, a ratio of the $T_1/T_2$ after the heat treatment was about 0.8 times to 1.2 times the $T_1/T_2$ before the heat treatment, thereby exhibiting a $T_1/T_2$ ratio similar to that before heat treatment even after the heat treatment.

On the other hand, in the aerogel composites of Comparative Examples 1 to 5, a ratio of the $T_1/T_2$ after the heat treatment was at most 0.75 times the $T_1/T_2$ before the heat treatment, 0.70 times or less in most cases. It has been confirmed that the $T_1/T_2$ ratio significantly decreased after the heat treatment compared to that before the heat treatment.

From the above-described experiment, it can be seen that the aerogel composite according to the present disclosure has high pore strength, and a sufficiently high degree of hydrophobicity inside pores, and thus, even when exposed to a high-temperature environment, the pores may be prevented from being contracted and deformed, or hydrophobic properties may be prevented from being significantly degraded on the surface and inside of the aerogel composite.

[Experimental Example 3] Evaluation of Hydrophobicity of Aerogel Composite (1)

1. Evaluation of Room-Temperature Hydrophobicity

The following experiments were performed to evaluate the degree of hydrophobicity on the surface and inside of the aerogel composite prepared according to the present disclosure.

1-1. Measurement of Surface Water Repellency

First, a sample having a size of 10 cm×10 cm (the thickness is about 5 mm) was obtained from each of Examples 1 to 5 and Comparative Examples 1 to 5, and floated on distilled water at a temperature of 21±2° C., and then, a 6.4 mm mesh screen was sunk to 127 mm below the surface of the water (impregnation). 15 minutes later, the mesh screen was removed, and when the sample rose to the surface, the sample was picked up with a clamp and was hung vertically for 60±5 seconds. Thereafter, the weights of the samples before/after the impregnation were each measured to calculate the surface water repellency according to Equation 1 below. The lower the surface water repellency, the better the degree of hydrophobicity on the surface of the silica aerogel composite. However, in Table 6 below, the experimental results were represented as an average value after repeatedly performing the experiment three times. At this time, the average value was rounded from the third decimal place and expressed to two decimal places.

$$\text{Moisture impregnation rate (wt \%)} = \{(\text{Weight of sample after impregnation–Weight of sample before impregnation})/(\text{Weight of sample before impregnation})\}\times100 \quad \text{[Equation 1]}$$

1-2. Measurement of Cross-Section Water Repellency

The cross-section water repellency was measured in the same manner as the surface water repellency after cutting a sample having a size of 10 cm×10 cm into a size of 1 cm×1 cm (the thickness is about 3 mm). However, in consideration of the size of the samples, the cross-section water repellency was represented as an average value after preparing five samples for each of Examples and Comparative Examples and repeating the same experiment three times for each sample. At this time, the average value was rounded from the third decimal place and expressed to two decimal places. Here, the lower the cross-section water repellency value, the better the degree of hydrophobicity inside the silica aerogel composite.

TABLE 6

| Classification | Surface water repellency (wt %) | Cross-section water repellency (wt %) |
|---|---|---|
| Example 1 | 1.86 | 1.12 |
| Example 2 | 1.05 | 0.63 |
| Example 3 | 2.13 | 1.08 |
| Example 4 | 1.13 | 0.72 |
| Example 5 | 3.14 | 1.21 |
| Comparative Example 1 | 10.13 | 6.68 |
| Comparative Example 2 | 5.64 | 5.52 |
| Comparative Example 3 | 12.02 | 8.15 |
| Comparative Example 4 | 4.71 | 4.29 |
| Comparative Example 5 | 8.07 | 7.85 |

As shown in Table 6 above, it can be seen that the surface water repellency of the aerogel composites (Examples 1 to 5) according to the present disclosure is low at approximately 4 wt % or less, and the cross-sectional water repellency thereof is also very low at 1.5 wt % or less. From the above, it can be seen that the aerogel composite according to the present disclosure has a high degree of hydrophobicity both on the surface and the inside, and has excellent water repellency.

On the contrary, it can be seen that the surface water repellency of the aerogel composites of Comparative Examples 1 to 5 is at a level of greater than 4 wt %, and the cross-section water repellency thereof is at a minimum of 3.65 wt % and at a maximum of 6.24 wt %, indicating very low water repellency, and the degree of hydrophobicity inside the aerogel composite is particularly low.

2. Evaluation of High-Temperature Hydrophobicity

In order to evaluate whether hydrophobicity is maintained even when samples of the aerogel composites prepared in Examples and Comparative Examples are heat-treated at a high temperature, each sample prepared in Examples 1 to 5 and Comparative Examples 1 to 5 was additionally subjected to normal-pressure drying at 200° C. for 1 hour, and then floated on distilled water at 21±2° C. as shown in 1-1 above to evaluate whether the sample is suspended on the distilled water, and the results are shown in Table 7 below. However, in Table 7 below, O represents a case in which the sample is suspended on the distilled water, Δ represents a case in which the sample is suspended inside the distilled water, and X represents a case in which the sample sinks to the bottom of a water tank.

TABLE 7

| Classification | Evaluation of high-temperature hydrophobicity |
|---|---|
| Example 1 | O |
| Example 2 | O |
| Example 3 | O |
| Example 4 | O |
| Example 5 | O |
| Comparative Example 1 | Δ |
| Comparative Example 2 | Δ |
| Comparative Example 3 | X |
| Comparative Example 4 | Δ |
| Comparative Example 5 | X |

As shown in Table 7 above, it was confirmed that all the samples of the aerogel composites (Examples 1 to 5) according to the present disclosure are suspended on the distilled water even after the heat treatment at high temperatures, and thus, maintain hydrophobicity.

On the other hand, it was confirmed that the samples of Comparative Examples 3 and 5 were not suspended in the distilled water after the heat treatment, but instead, all sank to the bottom of a water tank in which the test was performed. In the case of Comparative Examples 1, 2 and 4, the samples did not sink to the bottom of the water tank, but sank to about ⅓ to ½ of the depth of the water tank from the surface of the distilled water and were suspended inside the distilled water, so that it was found that hydrophobicity of the samples was not maintained but decreased due to the heat treatment.

[Experimental Example 4] Evaluation of Hydrophobicity of Aerogel Composite (2)

The following experiment was performed in accordance with the specifications of ASTM C1104 in order to evaluate the degree of hydrophobicity on the surface and inside of the aerogel composite prepared according to the present disclosure. First, a sample having a size of 15 cm×15 cm (thickness of 3 mm) was obtained from each of the aerogel composites of Examples 1 to 5 and Comparative Examples 1 to 5, and the sample was dried using a desiccator containing calcium chloride as a desiccant in an air circulation oven at 102° C. to 121° C. Thereafter, the dried sample was stored for 96 hours in an environment of 49±2° C. and a relative humidity of 95±3%, and then the percentage of a change in weight of the sample before and after water vapor absorption was measured as in Equation 2 below, and shown as a water vapor absorption rate. The water vapor absorption rate reflects the degree of hydrophobicity inside of a silica aerogel composite. However, in Table 8 below, the experimental results of the water vapor absorption rate were represented as an average value after repeatedly performing the experiment three times. At this time, the average value was rounded from the third decimal place and expressed to two decimal places.

$$\text{Water vapor absorption rate (wt \%)} = \qquad \text{[Equation 2]}$$
$$\{(\text{Weight of sample after experiment} -$$
$$\text{Weight of sample before experiment})/$$
$$(\text{Weight of sample before experiment})\} \times 100$$

TABLE 8

| Classification | Water vapor absorption rate (wt %) |
|---|---|
| Example 1 | 1.1 |
| Example 2 | 1.8 |
| Example 3 | 1.2 |
| Example 4 | 1.1 |
| Example 5 | 2.4 |
| Comparative Example 1 | 3.8 |
| Comparative Example 2 | 3.4 |
| Comparative Example 3 | 3.9 |
| Comparative Example 4 | 2.8 |
| Comparative Example 5 | 3.7 |

As shown in Table 8 above, it can be seen that the water vapor absorption rate of the aerogel composites of Examples 1 to 5 is low at approximately 2.5 wt % or less, whereas the water vapor absorption rate of the aerogel composites of Comparative Examples 1 to 5 is at least 2.8 wt %, and 3.5 wt % in most cases.

From the above, it can be seen that the aerogel composite according to the present disclosure has a high degree of hydrophobicity both on the surface and the inside, and has excellent water repellency.

[Experimental Example 5] Evaluation of Thermal Conductivity of Aerogel Composite 1. Measurement of Room-Temperature Thermal Conductivity In order to evaluate the room-temperature thermal conductivity of the aerogel composite prepared according to the present disclosure, the room-temperature thermal conductivity of the aerogel composite having a size of 60 cm×12 cm which was prepared in each of Examples and Comparative Examples was measured using the HFM436 equipment by Netzsch Co., and the results are shown in Table 9 below.

2. Measurement of High-Temperature Thermal Conductivity

In order to evaluate the thermal conductivity at high temperatures, the guarded hot plate (GHP) high-temperature thermal conductivity of the aerogel composite prepared in each of Examples and Comparative Examples was measured at a temperature of approximately 150° C. using the GHP 456 equipment by NETZSCH Co., and the results are shown in Table 9 below.

TABLE 9

| Classification | Room-temperature thermal conductivity (mW/mK) | High-temperature thermal conductivity (mW/mK) |
|---|---|---|
| Example 1 | 19 | 21.9 |
| Example 2 | 18.3 | 20.5 |
| Example 3 | 18.8 | 20.9 |
| Example 4 | 17.8 | 20.2 |
| Example 5 | 19.1 | 21.5 |
| Comparative Example 1 | 22.5 | 26.4 |
| Comparative Example 2 | 19.5 | 24.8 |
| Comparative Example 3 | 21.8 | 25.8 |
| Comparative Example 4 | 20.2 | 25.3 |
| Comparative Example 5 | 19.9 | 24.9 |

As shown in Table 9 above, it can be seen that the aerogel composites (Examples 1 to 5) according to the present disclosure have low thermal conductivity at both room temperature and high temperatures, and excellent heat insulation properties compared to the aerogel composites of Comparative Examples 1 to 5.

[Example 6] Preparation of Heat Insulation Member

To both sides of the aerogel composite prepared in each of Examples 1 to 5, a ALKYN-1505 (C) product by ALKYNES Co., in which a 25 μm-thick acrylic adhesive was applied to one side of a 25 μm-thick PET film, was attached to prepare a heat insulation member.

[Example 7] Preparation of Heat Insulation Member

To both sides of the aerogel composite prepared in each of Examples 1 to 5, a ALKYN-4005 (FR) product by ALKYNES Co., in which a 25 μm-thick acrylic adhesive was applied to one side of a 25 μm-thick flame retardant PET film, was attached to prepare a heat insulation member.

[Example 8] Preparation of Heat Insulation Member

To both sides of the aerogel composite prepared in each of Examples 1 to 5, a ALKYN-4004D (PS) product by ALKYNES Co., in which a 7 μm-thick polyester film and a 12 μm-thick PET film were sequentially stacked, and a 25 μm-thick acrylic adhesive was applied on the other side of the polyester film, was attached to prepare a heat insulation member.

An aerogel composite provided in the present disclosure has a high degree of hydrophobicity even inside pores of an aerogel matrix and also has excellent pore strength, and thus, may have minimized pore contraction and maintain high heat insulation even when a normal pressure drying process is performed during a process of manufacturing the aerogel composite, or the manufactured aerogel composite is exposed to a high-temperature environment.

What is claimed is:

1. An aerogel composite comprising: a substrate; and an aerogel including a plurality of open pores, wherein the aerogel includes a plurality of silica aerogel particles, wherein according to a result of performing an NMR analysis on the silica aerogel particles by using water ($H_2O$) as a saturation fluid, a ratio of $T_1$ relaxation time to $T_2$ relaxation time ($T_1/T_2$) is $0.4 \times 10^3$ to $1.0 \times 10^3$.

2. The aerogel composite of claim 1, wherein according to the result of performing the NMR analysis on the silica aerogel particles by using water ($H_2O$) as a saturation fluid, the ratio of $T_1$ relaxation time to $T_2$ relaxation time ($T_1/T_2$) is $0.4 \times 10^3$ to $0.9 \times 10^3$.

3. The aerogel composite of claim 1, wherein after heat-treating the silica aerogel particles at a temperature of 200° C. for 1 hour, and then performing the NMR analysis on the silica aerogel particles by using water ($H_2O$) as a saturation fluid, the ratio of $T_1$ relaxation time to $T_2$ relaxation time ($T_1/T_2$) is $0.4 \times 10^3$ to $1.0 \times 10^3$.

4. The aerogel composite of claim 3, wherein the ratio of $T_1/T_2$ of the silica aerogel particles after the heat-treating the silica aerogel particles at a temperature of 200° C. for 1 hour is 0.8 times to 1.2 times the ratio of $T_1/T_2$ of the silica aerogel particles before the heat-treating the silica aerogel particles at a temperature of 200° C. for 1 hour.

5. The aerogel composite of claim 3, wherein the ratio of $T_1/T_2$ of the silica aerogel particles after the heat-treating the silica aerogel particles at a temperature of 200° C. for 1 hour is 0.85 times to 1.1 times the ratio of $T_1/T_2$ of the aerogel particles before the heat-treating the silica aerogel particles at a temperature of 200° C. for 1 hour.

6. The aerogel composite of claim 1, wherein the aerogel comprises pores having a pore diameter of 5 nm to 20 nm at 25% or less of a pore volume of a skeletal structure of the aerogel.

7. The aerogel composite of claim 6, wherein the aerogel comprises pores having a pore diameter of 5 nm to 20 nm at 10% or greater and 25% or less of the pore volume of the skeletal structure of the aerogel.

8. The aerogel composite of claim 1, wherein the aerogel composite has a moisture impregnation rate (wt %) of 4 wt % or less, which is represented by Equation 1:

$$\text{Moisture impregnation rate (wt \%)} = \quad \text{[Equation 1]}$$
$$\{(\text{Weight of a sample after impregnation} -$$
$$\text{Weight of the sample before impregnation})/$$
$$(\text{Weight of the sample before impregnation})\} \times 100$$

wherein in Equation 1, the weight of a sample after impregnation is a weight measured after impregnating an aerogel composite sample in distilled water at 21±2° C. for 15 minutes, wherein the aerogel composite sample has a size of 100 mm×100 mm in width×length.

9. The aerogel composite of claim 1, wherein the aerogel composite has a moisture impregnation rate (wt %) of 3 wt % or less, which is represented by Equation 1:

$$\text{Moisture impregnation rate (wt \%)} = \quad \text{[Equation 1]}$$
$$\{(\text{Weight of a sample after impregnation} -$$
$$\text{Weight of the sample before impregnation})/$$
$$(\text{Weight of the sample before impregnation})\} \times 100$$

wherein in Equation 1, the weight of a sample after impregnation is a weight measured after impregnating an aerogel composite sample in distilled water at 21±2°

C. for 15 minutes, wherein the aerogel composite sample has a size of 10 mm×10 mm in width×length.

10. The aerogel composite of claim 8, wherein the moisture impregnation rate (wt %), represented by Equation 1, after performing a heat treatment on the aerogel composite at a temperature of 200° C. for 1 hour is 10 wt % or less.

11. The aerogel composite of claim 1, wherein the aerogel composite has a water vapor absorption rate of 2.5 wt % or less, according to the ASTM C1104 test method.

12. The aerogel composite of claim 1, wherein the aerogel comprises at least one selected from the group consisting of silica, methylsilylated silica, dimethylsilylated silica, and trimethylsilylated silica.

13. The aerogel composite of claim 1, wherein the plurality of silica aerogel particles comprises a particle in which a plurality of aerogel particles having a particle diameter of greater than 0 nm to 5 nm are aggregated or bonded.

14. The aerogel composite of claim 13, wherein the aggregated or bonded aerogel particles have an average particle diameter of 5 nm to 2,000 nm.

15. The aerogel composite of claim 1, wherein the aerogel composite has a thickness of 0.5 mm to 20 mm.

16. The aerogel composite of claim 1, wherein the aerogel composite has a density of 0.05 g/cm$^3$ to 0.50 g/cm$^3$.

17. The aerogel composite of claim 1, wherein the aerogel composite has a compressive strength of 20 kPa to 80 kPa at 10% strain, and has a tensile strength of 30 N/cm$^2$ to 60 N/cm$^2$.

18. A heat insulation member comprising the aerogel composite of claim 1.

19. The heat insulation member of claim 18, further comprising a support member positioned on at least one of an upper surface of the aerogel composite or a lower surface of the aerogel composite.

20. A battery module comprising a module case having an internal space, one or more battery cells positioned within the internal space, and the aerogel composite of claim 1 positioned within the internal space.

* * * * *